US010740963B2

(12) United States Patent
Cao

(10) Patent No.: US 10,740,963 B2
(45) Date of Patent: Aug. 11, 2020

(54) 3D VIRTUAL ENVIRONMENT GENERATING METHOD AND DEVICE

(71) Applicant: BEIJING XIAOXIAONIU CREATIVE TECHNOLOGIES LTD, Beijing (CN)

(72) Inventor: Xiang Cao, Beijing (CN)

(73) Assignee: BEIJING XIAOXIAONIU CREATIVE TECHNOLOGIES LTD, Beijing (CN)

( * ) Notice: Subject to any disclaimer, the term of this patent is extended or adjusted under 35 U.S.C. 154(b) by 78 days.

(21) Appl. No.: 16/091,264

(22) PCT Filed: Mar. 20, 2017

(86) PCT No.: PCT/CN2017/077335
§ 371 (c)(1),
(2) Date: Oct. 4, 2018

(87) PCT Pub. No.: WO2017/173918
PCT Pub. Date: Oct. 12, 2017

(65) Prior Publication Data
US 2019/0156567 A1 May 23, 2019

(30) Foreign Application Priority Data
Apr. 6, 2016 (CN) .......................... 2016 1 0207822

(51) Int. Cl.
G06T 17/00 (2006.01)
G06T 7/13 (2017.01)
(Continued)

(52) U.S. Cl.
CPC ................ G06T 17/05 (2013.01); G06T 7/13 (2017.01); G06T 7/40 (2013.01); G06T 7/60 (2013.01);
(Continued)

(58) Field of Classification Search
CPC .................................. G06T 7/13; G06T 17/00
See application file for complete search history.

(56) References Cited

U.S. PATENT DOCUMENTS

2015/0100145 A1  4/2015  Selvarajan
2015/0178933 A1* 6/2015  Han ........................ G06T 7/579
                                               382/154
(Continued)

FOREIGN PATENT DOCUMENTS

CN      101271526      9/2008
CN      101686334      3/2010
(Continued)

OTHER PUBLICATIONS

International Search Report dated Jun. 22, 2017 corresponding to International Patent Application No. PCT/CN2017/0077335; 2 pages.
(Continued)

Primary Examiner — Matthew Salvucci
(74) Attorney, Agent, or Firm — Leason Ellis LLP

(57) ABSTRACT

A method and a device for generating a three-dimensional virtual environment, wherein the method includes: acquiring a plane environment image captured by an image capturing device; extracting geometric information from the plane environment image to obtain geometric information of each two-dimensional element in the plane environment image; extracting content information from the plane environment image to obtain content information of each two-dimensional element in the plane environment image; respectively determining three-dimensional models corresponding to the two-dimensional elements according to the geometric information and the content information of each two-dimensional element; respectively rendering three-dimensional models corresponding to the two-dimensional elements at coordinates corresponding to the geometrical shape of each two-
(Continued)

dimensional element and generating a three-dimensional virtual environment.

11 Claims, 2 Drawing Sheets

(51) Int. Cl.
  *G06T 17/05* (2011.01)
  *G06T 17/10* (2006.01)
  *G06T 7/90* (2017.01)
  *G06T 7/40* (2017.01)
  *G06T 7/60* (2017.01)

(52) U.S. Cl.
  CPC ............... *G06T 7/90* (2017.01); *G06T 17/00* (2013.01); *G06T 17/10* (2013.01); *G06T 2200/08* (2013.01); *G06T 2207/20061* (2013.01)

(56) References Cited

U.S. PATENT DOCUMENTS

| 2015/0228114 A1 | 8/2015 | Shapira et al. |
| 2018/0276882 A1* | 9/2018 | Harviainen ........... G06T 19/006 |

FOREIGN PATENT DOCUMENTS

| CN | 101714262 | 5/2010 |
| CN | 102521877 | 6/2012 |
| CN | 102903142 | 1/2013 |
| CN | 103729885 | 4/2014 |
| CN | 104376596 | 2/2015 |
| CN | 104751511 | 7/2015 |
| CN | 104821011 | 8/2015 |
| CN | 105913485 | 8/2016 |
| DE | 102006013318 | 9/2006 |

OTHER PUBLICATIONS

Chinese Office Action dated Feb. 26, 2018 in Chinese Patent Application No. CN201610207822.6.

* cited by examiner

3D VIRTUAL ENVIRONMENT GENERATING METHOD AND DEVICE

CROSS-REFERENCE TO RELATED APPLICATIONS

This application is a 371 national phase application of international patent application No. PCT/CN2017/077335, filed on Mar. 20, 2017, which claims priority to Chinese Patent Application No. CN201610207822.6, filed with the Chinese Patent Office on Apr. 6, 2016, entitled "3D Virtual Environment Generating Method and Device", the content of each of which is incorporated herein by reference in its entirety.

TECHNICAL FIELD

The present disclosure relates to the technical field of image processing, and specifically to a method and a device for generating a three-dimensional virtual environment.

BACKGROUND ART

At present, with the rapid development of the computer graphics and image processing technology, a three-dimensional virtual environment can reproduce a realistic environment from a planar environment picture in a vivid and lively manner, which brings good visual effects and visual experiences to people, thus there is a significantly increasing trend in the demand for three-dimensional visualization technology, and therefore, the issue of how to create a required three-dimensional environment has been more and more widely focused on and researched, and has been widely applied to various industries.

Currently, a method for producing a three-dimensional virtual environment is provided in the related art, the method including: allowing a user to use a specialized three-dimensional modeling software, for example 3Dmax three-dimensional modeling software, to create a three-dimensional environment. During the implementation of the present disclosure, the inventor has found that there are at least the following problems in the related art: since it is necessary to use a specialized three-dimensional modeling software to produce a three-dimensional environment, the producer is required to be highly professional, and the production process is complicated and inefficient, only professional three-dimensional environment producers can produce the required three-dimensional environment, and the method of creating a three-dimensional virtual environment in the related art is relatively complicated, very difficult, and inefficient.

SUMMARY

In view of the above, an object of an embodiment of the present disclosure is to provide a method and a device for generating a three-dimensional virtual environment, so as to enable the production of a three-dimensional environment without using specialized three-dimensional modeling software, and rapidly render a corresponding three-dimensional environment from a planar environment image.

In a first aspect, an embodiment of the present disclosure provides a method for generating a three-dimensional virtual environment, the method including the steps of:

acquiring a planar environment image captured by an image capturing device, where the image capturing device comprises a camera device and a scanning device;

extracting geometric information from the planar environment image to obtain geometric information of each two-dimensional element in the planar environment image, where the geometric information comprises: a type of a geometric shape, a pattern of the geometric shape, and a coordinate corresponding to the geometric shape;

extracting content information from the planar environment image to obtain content information of each two-dimensional element in the planar environment image, where the content information comprises: color information, texture information, and/or text information;

respectively determining three-dimensional models corresponding to the two-dimensional elements according to the geometric information and the content information of each two-dimensional element; and respectively rendering three-dimensional models corresponding to the two-dimensional elements at coordinates corresponding to the geometric shape of each two-dimensional element and generating a three-dimensional virtual environment.

In combination with the first aspect, an embodiment of the present disclosure provides a first possible implementation of the first aspect, wherein the step of extracting geometric information from the planar environment image to obtain geometric information of each two-dimensional element in the planar environment image comprises the steps of:

extracting an edge image from the planar environment image according to an edge extraction algorithm to obtain a plurality of edge images corresponding to the respective two-dimensional elements in the planar environment image;

selecting an edge image as a current shape detection target from the respective edge images one by one, and sequentially selecting a shape detection mode from preset multiple shape detection modes to detect the shape of the current shape detection target;

selecting a next shape detection target from the unselected edge images until the geometric information of all the edge images is detected, when the geometric information of the current shape detection target is detected.

In combination with the first possible implementation of the first aspect, an embodiment of the present disclosure provides a second possible implementation of the first aspect, wherein the step of sequentially selecting a shape detection mode from preset multiple shape detection modes to detect the shape of the current shape detection target comprises the steps of:

performing circle detection on the current shape detection target based on the circle Hough transformation algorithm to recognize circles in the edge image; and determining a center coordinate and a radius of each of the recognized circles; or performing polygon fitting on the current shape detection target, and recognizing the number of nodes of each polygon obtained by the fitting; determining the number of sides of each polygon according to the recognized number of nodes; determining that the polygon is a triangle when the number of sides of the polygon is three, determining that the polygon is a quadrangle when the number of sides of the polygon is four, and determining that the polygon is a polygon of another closed shape when the number of sides of the polygon is more than four; and determining coordinates of the nodes of each of the polygons obtained by the fitting.

In combination with any of the first aspect to the second possible implementation of the first aspect, an embodiment of the present disclosure provides a third possible implementation of the first aspect, wherein the step of extracting content information from the planar environment image to obtain content information of each two-dimensional element in the planar environment image comprises the steps of:

performing image preprocessing on images in the respective two-dimensional elements one by one, where the preprocessing comprises binarization processing and/or noise reduction processing, and performing color space conversion of the preprocessed image; calculating a value of each color in each channel in a HSV color space; determining a main color of the image by using the HSV color histogram statistical method; searching a database, according to a color category of the main color, for a template color matching the color category; and using the template color as color information of the two-dimensional element;

performing image preprocessing on images in the respective two-dimensional elements one by one, where the preprocessing comprises binarization processing and/or noise reduction processing, and extracting a texture feature from the preprocessed image; calculating a degree of matching between the extracted texture feature of the image and a texture feature of each template texture in a pre-established texture database; and using the template texture with the highest matching degree as texture information of the two-dimensional element; and performing optical character recognition in the respective two-dimensional elements one by one to obtain digits or phrases contained in the respective two-dimensional elements; semantically classifying the recognized digits or phrases, and calculating degrees of matching between the digits or phrases and a template semantics set in a pre-established text database; and using the template semantics with the highest matching degree as text information of the two-dimensional element.

In combination with the first aspect, an embodiment of the present disclosure provides a fourth possible implementation of the first aspect, wherein after the step of respectively rendering three-dimensional models corresponding to the two-dimensional elements and generating a three-dimensional virtual environment, the method further comprises the steps of:

monitoring in real time whether the planar environment image is subjected to one or more of the following changes: movement, rotation, and modification; and re-rendering and generating a three-dimensional virtual environment according to the changed planar environment image; or adjusting the three-dimensional virtual environment according to the monitored change information.

In combination with the first aspect, an embodiment of the present disclosure provides a fifth possible implementation of the first aspect, wherein after the step of acquiring a planar environment image captured by an image capturing device, the method further comprises the steps of:

judging whether the planar environment image meets image processing requirements; and performing image preprocessing on the planar environment image if not, where the image preprocessing comprises: binarization processing and/or noise reduction processing.

In combination with the first aspect, an embodiment of the present disclosure provides a sixth possible implementation of the first aspect, wherein after the step of extracting content information from the planar environment image to obtain content information of each two-dimensional element in the planar environment image, the method further comprises the step of: acquiring a theme type selected by a user terminal, where the theme type comprises: Chinese classicism, future city, or natural island; and the step of respectively determining three-dimensional models corresponding to the two-dimensional elements according to the geometric information and the content information of each two-dimensional element comprises the step of: respectively determining three-dimensional models corresponding to the two-dimensional elements according to the acquired theme type, and the geometric information and the content information of each two-dimensional element; or the respective rendering of three-dimensional models corresponding to the two-dimensional elements comprises: respectively rendering three-dimensional models corresponding to the two-dimensional elements according to the acquired theme type.

In a second aspect, an embodiment of the present disclosure also provides a device for generating a three-dimensional virtual environment, the device including:

an image acquisition module configured to acquire a planar environment image captured by an image capturing device, where the image capturing device comprises a camera device and/or a scanning device;

a geometric information extraction module configured to extract geometric information from the planar environment image to obtain geometric information of each two-dimensional element in the planar environment image, where the geometric information comprises: a type of a geometric shape, a pattern of the geometric shape, and a coordinate corresponding to the geometric shape;

a content information extraction module configured to extract content information from the planar environment image to obtain content information of each two-dimensional element in the planar environment image, where the content information comprises: color information, texture information, and/or text information;

a three-dimensional model determination module configured to respectively determine three-dimensional models corresponding to the two-dimensional elements according to the geometric information and the content information of each two-dimensional element; and a three-dimensional virtual environment generation module configured to respectively render three-dimensional models corresponding to the two-dimensional elements at coordinates corresponding to the geometric shape of each two-dimensional element and generate a three-dimensional virtual environment.

In combination with the second aspect, an embodiment of the present disclosure provides a first possible implementation of the second aspect, wherein the geometric information extraction module comprises:

an edge image extraction unit configured to extract an edge image from the planar environment image according to an edge extraction algorithm to obtain a plurality of edge images corresponding to the respective two-dimensional elements in the planar environment image; and a shape detection unit configured to select an edge image as a current shape detection target from the respective edge images one by one, and sequentially select a shape detection mode from preset multiple shape detection modes to detect the shape of the current shape detection target; and to select a next shape detection target from the unselected edge images until the geometric information of all the edge images is detected, when the geometric information of the current shape detection target is detected.

In combination with the second aspect or the first possible implementation of the second aspect, an embodiment of the present disclosure provides a second possible implementation of the second aspect, wherein the content information extraction module comprises:

a color information extraction unit configured to perform image preprocessing on images in the respective two-dimensional elements one by one, the preprocessing including binarization processing and/or noise reduction processing, and to perform color space conversion of the preprocessed image; to calculate a value of each color in each channel in a HSV color space; to determine a main color of the image by using the HSV color histogram statistical method; to search a database, according to a color category of the main color, for a template color matching the color category; and to use the template color as color information of the two-dimensional element;

a texture information extraction unit configured to perform image preprocessing on images in the respective two-dimensional elements one by one, the preprocessing including binarization processing and/or noise reduction processing, and to extract a texture feature from the preprocessed image; to calculate a degree of matching between the extracted texture feature of the image and a texture feature of each template texture in a pre-established texture database; and to use the template texture with the highest matching degree as texture information of the two-dimensional element; and a text information extraction unit configured to perform optical character recognition in the respective two-dimensional elements one by one to obtain digits or phrases contained in the respective two-dimensional elements; to semantically classify the recognized digits or phrases, and calculate degrees of matching between the digits or phrases and a template semantics set in a pre-established text database; and to use the template semantics with the highest matching degree as text information of the two-dimensional element.

In the method and device for generating a three-dimensional virtual environment provided by the embodiments of the present disclosure, the method comprises: acquiring a planar environment image captured by an image capturing device; extracting geometric information from the planar environment image to obtain geometric information of each two-dimensional element in the planar environment image; extracting content information from the planar environment image to obtain content information of each two-dimensional element in the planar environment image; respectively determining three-dimensional models corresponding to the two-dimensional elements according to the geometric information and the content information of each two-dimensional element; and respectively rendering three-dimensional models corresponding to the two-dimensional elements at coordinates corresponding to the geometric shape of each two-dimensional element and generating a three-dimensional virtual environment. In the embodiments of the present disclosure, geometric information and content information of each two-dimensional element in a planar environment image are automatically extracted, and then a three-dimensional model corresponding to each two-dimensional element is determined, so that a three-dimensional environment can be produced without using specialized three-dimensional modeling software, and rapid rendering of a corresponding three-dimensional environment from a planar environment picture can be achieved, thereby reducing the difficulty in creating a three-dimensional environment and improving the efficiency of creating a three-dimensional environment.

In order that the above objects, features and advantages of the present disclosure can be clearer and easier to understand, preferred embodiments will be described below in detail by way of example with reference to the accompanying drawings.

BRIEF DESCRIPTION OF DRAWINGS

For illustrating technical solutions of embodiments of the present disclosure more clearly, drawings required for use in the embodiments will be introduced briefly below. It is to be understood that the drawings below are merely illustrative of some embodiments of the present disclosure, and therefore should not to be considered as limiting the scope of the disclosure. It would be understood by those of ordinary skill in the art that other relevant drawings could also be obtained from these drawings without any inventive effort.

DETAILED DESCRIPTION OF EMBODIMENTS

In order to make the objects, technical solutions and advantages of the embodiments of the present disclosure clearer, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations. Thus, the following detailed description of the embodiments of the present disclosure, as represented in the figures, is not intended to limit the scope of the present disclosure as claimed, but is merely representative of selected embodiments of the present disclosure. All the other embodiments obtained by those skilled in the art in light of the embodiments of the present disclosure without inventive efforts would fall within the scope of the present disclosure as claimed.

Considering that in the related art it is necessary to use a specialized three-dimensional modeling software to produce a three-dimensional environment, the producer is required to be highly professional, and the production process is complicated and inefficient, only professional three-dimensional environment producers can produce the required three-dimensional environment, and the method of creating a three-dimensional virtual environment in the related art is relatively complicated, very difficult, and inefficient. On this basis, an embodiment of the present disclosure provides a method and a device for generating a three-dimensional virtual environment, which are described below in connection with the embodiment.

Figure 1:
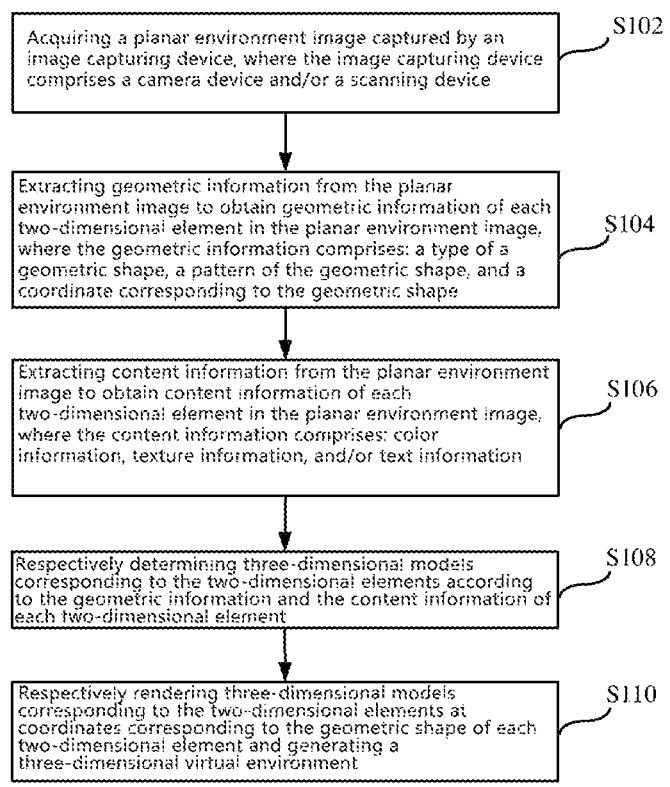
FIG. 1 illustrates a schematic flowchart of a method for generating a three-dimensional virtual environment provided by an embodiment of the present disclosure.

As shown in FIG. 1, an embodiment of the present disclosure provides a method for generating a three-dimensional virtual environment, the method including steps S102 to S110, which are described specifically as follows:

Step S102: acquiring a planar environment image captured by an image capturing device, where the image capturing device may be a camera device with a camera, or a scanning device having a scanning function, or may also be any other device having an image capturing function;

it should be noted that in addition to using a camera device with a camera or a scanning device (such as a scanner) having a scanning function to recognize a visual element, the nature and location of an element created by the user may be sensed in any other manner, and for example, a case where various RFID or magnetic elements are placed by the user on a creation plane and their types and locations are obtained by an RFID reader or magnetic sensor is within the scope of the present disclosure;

Step S104: extracting geometric information from the planar environment image to obtain geometric information of each two-dimensional element in the planar environment image, where the geometric information comprises: a type of a geometric shape, a pattern of the geometric shape, and a coordinate corresponding to the geometric shape;

Step S106: extracting content information from the planar environment image to obtain content information of each two-dimensional element in the planar environment image, where the content information comprises: color information, texture information, and/or text information;

Step S108: respectively determining three-dimensional models corresponding to the two-dimensional elements according to the geometric information and the content information of each two-dimensional element; and Step S110: respectively rendering three-dimensional models corresponding to the two-dimensional elements at coordinates corresponding to the geometric shape of each two-dimensional element and generating a three-dimensional virtual environment.

In the embodiment provided in the present disclosure, geometric information and content information of each two-dimensional element in a planar environment image are automatically extracted, and then a three-dimensional model corresponding to each two-dimensional element is determined according to the geometric information and the content information of each two-dimensional element, and finally, the three-dimensional models corresponding to the two-dimensional elements are rendered respectively and a three-dimensional virtual environment is generated, so that a three-dimensional environment can be produced without using specialized three-dimensional modeling software in the whole process, and rapid rendering of a corresponding three-dimensional environment from a planar environment picture can be achieved, thereby reducing the difficulty in creating a three-dimensional environment and improving the efficiency of creating a three-dimensional environment.

Here, the step of respectively determining three-dimensional models corresponding to the two-dimensional elements according to the geometric information and the content information of each two-dimensional element specifically comprises:

first, selecting a category (e.g., a forest, a lake, a house, a mountain, a street lamp, or the like) of a three-dimensional model corresponding to the two-dimensional element according to some information of the two-dimensional element; and then, determining a specific form and other attributes (e.g., color, texture, etc.) of the three-dimensional model according to the category in combination with other information of the two-dimensional element.

Several specific rules for determining a three-dimensional model will be given in the following description, but any other possible determination rule is not excluded, and the respective determination rules are independent of each other, and may be arbitrarily combined according to actual needs. One or more of the generation rules may be selected and used in one specific implementation, or other rules for determining a three-dimensional model may also be added according to actual needs.

When the geometric information of the two-dimensional element itself constitutes a special pattern predefined in a database, a category of the corresponding three-dimensional model may be selected according to the pattern (for example, the pattern represents  a street lamp, and the pattern  represents a person), and in addition, the specific form of the three-dimensional model of the category may also be predefined in the database.

When the geometric information of the two-dimensional element itself constitutes a relatively regular shape (such as a rectangle, a circle, a polygon with a particular number of sides, but with some free parameters being not defined, such as the length and width), the category of the corresponding three-dimensional model may be selected according to the shape (for example, the rectangle represents a house), and in addition, a part of the specific form of the three-dimensional model may be predefined in the database (for example, the overall structure of the house), and the other part of the parameters may be determined according to the specific parameters of the shape of the two-dimensional element (for example, the length and width of the house are corresponding to the length and width of the rectangle); or the specific form of the three-dimensional model may also be further determined according to the content information of the two-dimensional element (for example, different color information represents houses of different structures, and the text information "2" represents that the house has two floors).

When the content information of the two-dimensional element has a certain particular color or texture, or contains a particular text (the shape of the two-dimensional element may be an arbitrary closed graphic or open line), the category of the three-dimensional model may be selected according to the particular content information (for example, blue represents a lake, tile texture represents a house, the word "mountain" represents a mountain, and a particular sign represents a farmland). The shape/contour of the two-dimensional element is directly converted into a specific form of a three-dimensional model by a preset algorithm, so that the top view of the three-dimensional model is consistent with the shape/contour of the two-dimensional element (for example, the shape of a green area is filled with a group of three-dimensional trees, or a three-dimensional mountain is generated using the two-dimensional contour of the mountain as a contour line).

When both the geometric information and the content information of the two-dimensional element do not have any one of the above particular attributes (for example, an arbitrary closed graphic or open line has a color/texture but not conforming to any of those predefined in the database), a category of a certain default three-dimensional model may be selected (for example, the open line represents a road) and the specific form of the three-dimensional model is made consistent with the shape/contour of the two-dimensional element (such as the direction of the road), or it may also be ignored and not converted into a three-dimensional model.

When the above various rules for determining a three-dimensional model are applicable to a two-dimensional element at the same time, various priority strategies can be set according to the actual situations. For example, a blue circle may be understood as a tower (the category of the three-dimensional model is selected by the circle), or understood as a lake (the category of the three-dimensional model is selected by blue), and the priority strategy can be set so that the category of the three-dimensional model is selected preferentially according to the shape, or the category of the three-dimensional model is selected preferentially according to the color information; and it is also possible that a main category of the three-dimensional model is selected by one of the rules (for example, the tile texture represents a house), and then a sub-category of the three-dimensional model is selected by another rule (for example, the rectangle represents an office building on the premise that the house has been determined).

Further, after the category of the three-dimensional model is selected and the specific form of the three-dimensional model is generated, a detailed attribute may be added to the three-dimensional model according to other attributes of the two-dimensional element. For example, the color information/texture information of the two-dimensional element is directly mapped into color information/texture information of the three-dimensional model, or a predefined color/texture/decorative style is selected from the database according to the color/texture/text of the two-dimensional element, or a substructure is added to the three-dimensional model according to other information contained in the two-dimensional element (for example, if two particular patterns representing a chimney are rendered/adhered/placed inside a two-dimensional shape representing a house, then two chimneys appear in the corresponding locations of the three-dimensional model of the house).

Specifically, the step of extracting geometric information from the planar environment image to obtain geometric information of each two-dimensional element in the planar environment image comprises:

extracting an edge image from the planar environment image according to an edge extraction algorithm to obtain a plurality of edge images corresponding to the respective two-dimensional elements in the planar environment image;

selecting an edge image as a current shape detection target from the respective edge images one by one, and sequentially selecting a shape detection mode from preset multiple shape detection modes to detect the shape of the current shape detection target; and selecting a next shape detection target from the unselected edge images until the geometric information of all the edge images is detected, when the geometric information of the current shape detection target is detected.

Here, the step of sequentially selecting a shape detection mode from preset multiple shape detection modes to detect the shape of the current shape detection target comprises:

performing circle detection on the current shape detection target based on the circle Hough transformation algorithm to recognize circles in the edge image; and determining a center coordinate and a radius of each of the recognized circles; or performing polygon fitting on the current shape detection target, and recognizing the number of nodes of each polygon obtained by the fitting; determining the number of sides of each polygon according to the recognized number of nodes; determining that the polygon is a triangle when the number of sides of the polygon is three, determining that the polygon is a quadrangle when the number of sides of the polygon is four, and determining that the polygon is a polygon of another closed shape when the number of sides of the polygon is more than four; and determining coordinates of the nodes of each of the polygons obtained by the fitting.

Specifically, the step of extracting content information from the planar environment image to obtain content information of each two-dimensional element in the planar environment image comprises:

performing image preprocessing on images in the respective two-dimensional elements one by one, where the preprocessing comprises binarization processing and/or noise reduction processing, and performing color space conversion of the preprocessed image; calculating a value of each color in each channel in a HSV color space; determining a main color of the image by using the HSV color histogram statistical method; searching a database, according to a color category of the main color, for a template color matching the color category; and using the template color as color information of the two-dimensional element;

performing image preprocessing on images in the respective two-dimensional elements one by one, where the preprocessing comprises binarization processing and/or noise reduction processing, and extracting a texture feature from the preprocessed image; calculating a degree of matching between the extracted texture feature of the image and a texture feature of each template texture in a pre-established texture database; and using the template texture with the highest matching degree as texture information of the two-dimensional element; and performing optical character recognition in the respective two-dimensional elements one by one to obtain digits or phrases contained in the respective two-dimensional elements; semantically classifying the recognized digits or phrases, and calculating degrees of matching between the digits or phrases and a template semantics set in a pre-established text database; and using the template semantics with the highest matching degree as text information of the two-dimensional element.

Further, after the step of respectively rendering three-dimensional models corresponding to the two-dimensional elements and generating a three-dimensional virtual environment, the method further comprises:

monitoring in real time whether the planar environment image is subjected to one or more of the following changes: movement, rotation, and modification; and re-rendering and generating a three-dimensional virtual environment according to the changed planar environment image; or adjusting the three-dimensional virtual environment according to the monitored change information.

Further, after the step of acquiring a planar environment image captured by an image capturing device, the method further comprises:

judging whether the planar environment image meets image processing requirements;

performing image preprocessing on the planar environment image if not, where the image preprocessing comprises: binarization processing and/or noise reduction processing.

Further, after the step of extracting content information from the planar environment image to obtain content information of each two-dimensional element in the planar environment image, the method further comprises: acquiring a theme type selected by a user terminal, where the theme type comprises: Chinese classicism, future city, or natural island.

The step of respectively determining three-dimensional models corresponding to the two-dimensional elements according to the geometric information and the content information of each two-dimensional element comprises: respectively determining three-dimensional models corresponding to the two-dimensional elements according to the acquired theme type, and the geometric information and the content information of each two-dimensional element; or the respective rendering of three-dimensional models corresponding to the two-dimensional elements comprises:

respectively rendering three-dimensional models corresponding to the two-dimensional elements according to the acquired theme type.

Here, each theme type in the database is corresponding to a different rule set and/or three-dimensional model style, therefore different three-dimensional virtual environments are generated from the same planar environment image under different theme types.

In the embodiment provided in the present disclosure, geometric information and content information of each two-dimensional element in a planar environment image are automatically extracted, and then a three-dimensional model corresponding to each two-dimensional element is determined according to the geometric information and the content information of each two-dimensional element, and finally, the three-dimensional models corresponding to the two-dimensional elements are rendered respectively and a three-dimensional virtual environment is generated, so that a three-dimensional environment can be produced without using specialized three-dimensional modeling software in the whole process, and rapid rendering of a corresponding three-dimensional environment from a planar environment picture can be achieved, thereby reducing the difficulty in creating a three-dimensional environment and improving the efficiency of creating a three-dimensional environment.

Figure 2:
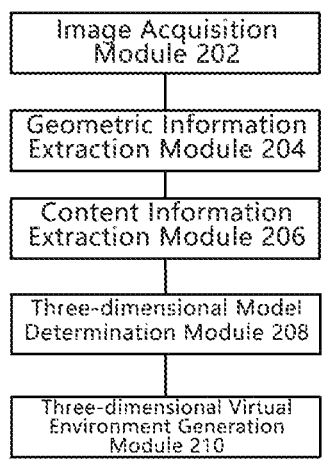
FIG. 2 illustrates a schematic structural diagram of a device for generating a three-dimensional virtual environment provided by an embodiment of the present disclosure.

An embodiment of the present disclosure also provides a device for generating a three-dimensional virtual environment, corresponding to the method for generating a three-dimensional virtual environment described above. As shown in FIG. 2, the device comprises:

an image acquisition module 202 configured to acquire a planar environment image captured by an image capturing device, where the image capturing device comprises a camera device and/or a scanning device;

a geometric information extraction module 204 configured to extract geometric information from the planar environment image to obtain geometric information of each two-dimensional element in the planar environment image, where the geometric information comprises: a type of a geometric shape, a pattern of the geometric shape, and a coordinate corresponding to the geometric shape;

a content information extraction module 206 configured to extract content information from the planar environment image to obtain content information of each two-dimensional element in the planar environment image, where the content information comprises: color information, texture information, and/or text information;

a three-dimensional model determination module 208 configured to respectively determine three-dimensional models corresponding to the two-dimensional elements according to the geometric information and the content information of each two-dimensional element; and a three-dimensional virtual environment generation module 210 configured to respectively render three-dimensional models corresponding to the two-dimensional elements at coordinates corresponding to the geometric shape of each two-dimensional element and generate a three-dimensional virtual environment.

Further, the geometric information extraction module 204 comprises:

an edge image extraction unit configured to extract an edge image from the planar environment image according to an edge extraction algorithm to obtain a plurality of edge images corresponding to the respective two-dimensional elements in the planar environment image; and a shape detection unit configured to select an edge image as a current shape detection target from the respective edge images one by one, and sequentially select a shape detection mode from preset multiple shape detection modes to detect the shape of the current shape detection target; and to select a next shape detection target from the unselected edge images until the geometric information of all the edge images is detected, when the geometric information of the current shape detection target is detected.

Further, the content information extraction module 206 comprises:

a color information extraction unit configured to perform image preprocessing on images in the respective two-dimensional elements one by one, the preprocessing including binarization processing and/or noise reduction processing, and to perform color space conversion of the preprocessed image; to calculate a value of each color in each channel in a HSV color space; to determine a main color of the image by using the HSV color histogram statistical method; to search a database, according to a color category of the main color, for a template color matching the color category; and to use the template color as color information of the two-dimensional element;

a texture information extraction unit configured to perform image preprocessing on images in the respective two-dimensional elements one by one, the preprocessing including binarization processing and/or noise reduction processing, and to extract a texture feature from the preprocessed image; to calculate a degree of matching between the extracted texture feature of the image and a texture feature of each template texture in a pre-established texture database; and to use the template texture with the highest matching degree as texture information of the two-dimensional element; and a text information extraction unit configured to perform optical character recognition in the respective two-dimensional elements one by one to obtain digits or phrases contained in the respective two-dimensional elements; to semantically classify the recognized digits or phrases, and calculate degrees of matching between the digits or phrases and a template semantics set in a pre-established text database; and to use the template semantics with the highest matching degree as text information of the two-dimensional element.

As can be seen based on the above analysis, compared with the device for generating a three-dimensional virtual environment in relevant art, in the embodiment provided in the present disclosure, geometric information and content information of each two-dimensional element in a planar environment image are automatically extracted, and then a three-dimensional model corresponding to each two-dimensional element is determined according to the geometric information and the content information of each two-dimensional element, and finally, the three-dimensional models corresponding to the two-dimensional elements are rendered respectively and a three-dimensional virtual environment is generated, so that a three-dimensional environment can be produced without using specialized three-dimensional modeling software in the whole process, and rapid rendering of a corresponding three-dimensional environment from a planar environment picture can be achieved, thereby reducing the difficulty in creating a three-dimensional environment and improving the efficiency of creating a three-dimensional environment.

The device for generating a three-dimensional virtual environment according to the embodiment of the present disclosure may be particular hardware on an apparatus, or software or firmware or the like installed on an apparatus. The device according to the embodiment of the present disclosure is implemented based on the same principle and creates the same technical effects as the foregoing embodiment of the method, and for parts of the embodiment of the device that are not mentioned, reference can be made to corresponding description in the foregoing embodiment of the method for the sake of brevity of the description. It will be clearly appreciated by those skilled in the art that, for convenience and brevity of the description, specific working processes of the system, device and units described above may be performed with reference to the corresponding processes in the foregoing embodiment of the method and will not be described repeatedly herein.

In the embodiments provided in the present application, it should be understood that the disclosed device and method may be implemented in other ways. The embodiment of the device described above is merely illustrative. For example, the division of the units is only carried out by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via some communication interfaces, while indirect coupling or communication connection between devices or units may be electronic, mechanical, or in other forms.

The units described as separate components may be or not be separated physically, and the components illustrated as units may be or not be physical units, namely, they may be located at one place or they may be distributed onto multiple network units. Some or all of the units may be selected as actually required to fulfill the purposes of the solutions of the present embodiments.

Besides, the individual functional units in the embodiments provided in the present disclosure may be integrated in one processing unit, or may be physically stand-alone, or two or more of the units may be integrated into one unit.

When implemented in the form of a software functional unit and sold or used as an independent product, the functions may be stored in a computer-readable storage medium. Based on such understanding, the technical solutions of the present disclosure essentially, or the part thereof contributing to the prior art, or a part of the technical solutions may be embodied in the form of a software product. The computer software product is stored in a storage medium, and comprises a number of instructions for causing a computer device (which may be a personal computer, a server, a network device, or the like) to execute all or some of the steps of the methods described in the various embodiments of the present disclosure. The preceding storage medium comprises any medium that can store program codes, such as a USB flash disk, a mobile hard disk, a read-only memory (ROM), a random access memory (RAM), a magnetic disk, an optical disk, etc.

It should be noted that similar reference numerals and letters refer to similar items in the following figures, and thus once an item is defined in one figure, it may not be further defined or explained in the following figures. In addition, the terms such as "first", "second", and "third" are intended to distinguish the description, and should not be understood as an indication or implication of relative importance.

Finally, it should be noted that the embodiments described above are merely specific embodiments of the present disclosure, which are intended to illustrate the technical solutions of the present disclosure but not intended to limit the same, and to which the scope of protection of the present disclosure is not limited. Although the present disclosure has been illustrated in detail with reference to the foregoing embodiments, it should be understood by those skilled in the art that the technical solutions described in the foregoing embodiments can be modified, or variations thereof can be readily conceived of, or some of the technical features thereof can be equivalently replaced by those skilled in the art within the technical scope disclosed in the present disclosure; and these modifications, variations or replacements do not cause the essence of the corresponding technical solution to depart from the spirit and scope of the technical solutions of the embodiments of the disclosure, and are therefore to be encompassed within the scope of protection of the present disclosure. Therefore, the scope of protection of the present disclosure is to be defined by the scope of the appended claims.

The invention claimed is:

1. A method for generating a three-dimensional virtual environment, the method comprises steps of:
   acquiring a planar environment image captured by an image capturing device, wherein the image capturing device comprises a camera device and a scanning device;
   extracting geometric information from the planar environment image to obtain geometric information of each two-dimensional element in the planar environment image, wherein the geometric information comprises: a type of a geometric shape, a pattern of the geometric shape, and a coordinate corresponding to the geometric shape;
   extracting content information from the planar environment image to obtain content information of each two-dimensional element in the planar environment image, wherein the content information comprises: color information, texture information, and/or text information;
   respectively determining three-dimensional models corresponding to the two-dimensional elements according to the geometric information and the content information of each two-dimensional element; and
   respectively rendering three-dimensional models corresponding to the two-dimensional elements, at coordinates corresponding to the geometric shape of each two-dimensional element and generating a three-dimensional virtual environment,
wherein the step of extracting content information from the planar environment image to obtain content information of each two-dimensional element in the planar environment image comprises steps of:
   performing image preprocessing on images in the respective two-dimensional elements one by one, determining a main color of the image; searching a database, according to a color category of the main color, for a template color matching the color category; and using the template color as color information of the two-dimensional element;
   performing image preprocessing on images in the respective two-dimensional elements one by one, wherein the preprocessing comprises binarization processing and noise reduction processing, and extracting a texture feature from the preprocessed image; calculating a degree of matching between the extracted texture feature of the image and a texture feature of each template texture in a pre-established texture database; and using the template texture with the highest matching degree as texture information of the two-dimensional element; and performing optical character recognition in the respective two-dimensional elements one by one to obtain digits or phrases contained in the respective two-dimensional elements; semantically classifying the recognized digits or phrases, and calculating degrees of matching between the digits or phrases and a template semantics set in a pre-established text database; and using the template semantics with the highest matching degree as text information of the two-dimensional element.

2. The method for generating a three-dimensional virtual environment according to claim 1, wherein the step of extracting geometric information from the planar environment image to obtain geometric information of each two-dimensional element in the planar environment image comprises:

performing edge image extraction on the planar environment image according to an edge extraction algorithm to obtain a plurality of edge images corresponding to the respective two-dimensional elements in the planar environment image;

selecting sequentially one edge image from the respective edge images, as a current shape detection target, and sequentially selecting a shape detection mode from preset multiple shape detection modes to detect the shape of the current shape detection target; and selecting a next shape detection target from the unselected edge images until the geometric information of all the edge images is detected, when the geometric information of the current shape detection target is detected.

3. The method for generating a three-dimensional virtual environment according to claim 2, wherein the step of sequentially selecting a shape detection mode from preset multiple shape detection modes to detect the shape of the current shape detection target comprises:

performing a circle detection on the current shape detection target based on the circle Hough transformation algorithm, to recognize circles in the edge image; and determining a center coordinate and a radius of each of the recognized circles; or performing a polygon fitting on the current shape detection target, and recognizing the number of nodes of each polygon obtained by the fitting; determining the number of sides of each polygon according to the recognized number of nodes; determining that the polygon is a triangle when the number of sides of the polygon is three, determining that the polygon is a quadrangle when the number of sides of the polygon is four, and determining that the polygon is a polygon of another closed shape when the number of sides of the polygon is more than four; and determining coordinates of the nodes of each of the polygons obtained by the fitting.

4. The method for generating a three-dimensional virtual environment according to claim 1, wherein after the step of respectively rendering three-dimensional models corresponding to the two-dimensional elements and generating a three-dimensional virtual environment, the method further comprises steps of:

monitoring in real time whether the planar environment image is subjected to one or more of following changes: movement, rotation, and modification; and re-rendering and generating a three-dimensional virtual environment according to the changed planar environment image; or adjusting the three-dimensional virtual environment according to the monitored change information.

5. The method for generating a three-dimensional virtual environment according to claim 1, wherein after the step of acquiring a planar environment image captured by an image capturing device, the method further comprises steps of:

judging whether the planar environment image meets an image processing requirement; and performing image preprocessing on the planar environment image if not, wherein the image preprocessing comprises: binarization processing and/or noise reduction processing.

6. The method for generating a three-dimensional virtual environment according to claim 1, wherein after the step of extracting content information from the planar environment image to obtain content information of each two-dimensional element in the planar environment image, the method further comprises the step of: acquiring a theme type selected by a user terminal; and the step of respectively determining three-dimensional models corresponding to the two-dimensional elements according to the geometric information and the content information of each two-dimensional element comprises: respectively determining three-dimensional models corresponding to the two-dimensional elements according to the acquired theme type, and the geometric information and the content information of each two-dimensional element; or the respective rendering of three-dimensional models corresponding to the two-dimensional elements comprises: respectively rendering three-dimensional models corresponding to the two-dimensional elements according to the acquired theme type.

7. The method for generating a three-dimensional virtual environment according to claim 6, wherein the theme type comprises Chinese classicism, future city, or natural island.

8. The method for generating a three-dimensional virtual environment according to claim 1, wherein the preprocessing before the step of determining a main color of the image comprises binarization processing and noise reduction processing, and the step of determining a main color of the image comprises performing color space conversion of the preprocessed image; calculating a value of each color in each channel in a HSV color space; and determining a main color of the image by using the HSV color histogram statistical method.

9. A device for generating a three-dimensional virtual environment, wherein the device comprises:

an image acquisition module configured to acquire a planar environment image captured by an image capturing device, wherein the image capturing device comprises a camera device and/or a scanning device;

a geometric information extraction module configured to extract geometric information from the planar environment image to obtain geometric information of each two-dimensional element in the planar environment image, wherein the geometric information comprises: a type of a geometric shape, a pattern of the geometric shape, and a coordinate corresponding to the geometric shape;

a content information extraction module configured to extract content information from the planar environment image to obtain content information of each two-dimensional element in the planar environment image, wherein the content information comprises: color information, texture information, and/or text information;

a three-dimensional model determination module configured to respectively determine three-dimensional models corresponding to the two-dimensional elements according to the geometric information and the content information of each two-dimensional element; and a three-dimensional virtual environment generation module configured to respectively render three-dimensional models corresponding to the two-dimensional elements at coordinates corresponding to the geometric shape of each two-dimensional element and generate a three-dimensional virtual environment, wherein the content information extraction module comprises:

a color information extraction unit configured to perform image preprocessing on images in the respective two-dimensional elements one by one; to determine a main color of the image; to search a database, according to a color category of the main color, for a template color matching the color category; and to use the template color as color information of the two-dimensional element;

a texture information extraction unit configured to perform image preprocessing on images in the respective two-dimensional elements one by one, the preprocessing comprising binarization processing and/or noise reduction processing, and to extract a texture feature from the preprocessed image; to calculate a degree of matching between the extracted texture feature of the image and a texture feature of each template texture in a pre-established texture database; and to use the template texture with the highest matching degree as texture information of the two-dimensional element; and a text information extraction unit configured to perform optical character recognition in the respective two-dimensional elements one by one to obtain digits or phrases contained in the respective two-dimensional elements; to semantically classify the recognized digits or phrases, and calculate degrees of matching between the digits or phrases and a template semantics set in a pre-established text database; and to use the template semantics with the highest matching degree as text information of the two-dimensional element.

10. The device for generating a three-dimensional virtual environment according to claim 9, wherein the geometric information extraction module comprises:

an edge image extraction unit configured to performing edge image extraction on the planar environment image according to an edge extraction algorithm to obtain a plurality of edge images corresponding to the respective two-dimensional elements in the planar environment image; and a shape detection unit configured to sequentially select one edge image as a current shape detection target from the respective edge images, and sequentially select a shape detection mode from preset multiple shape detection modes to detect the shape of the current shape detection target; and to select a next shape detection target from the unselected edge images until the geometric information of all the edge images is detected, when the geometric information of the current shape detection target is detected.

11. The device for generating a three-dimensional virtual environment according to claim 9, wherein the color information extraction unit configured to perform image preprocessing on images in the respective two-dimensional elements one by one, the preprocessing comprising binarization processing and/or noise reduction processing, and to perform a color space conversion of the preprocessed image; to calculate a value of each color in each channel in a HSV color space; to determine a main color of the image by using the HSV color histogram statistical method; to search a database, according to a color category of the main color, for a template color matching the color category; and to use the template color as color information of the two-dimensional element.

\* \* \* \* \*